US008681614B1

(12) United States Patent
McCanne et al.

(10) Patent No.: US 8,681,614 B1
(45) Date of Patent: Mar. 25, 2014

(54) QUALITY OF SERVICE FOR INBOUND NETWORK TRAFFIC FLOWS

(75) Inventors: Steven McCanne, Berkeley, CA (US); Henri Dubois-Ferriere, Lausanne (CH); Andrew Swan, Berkeley, CA (US)

(73) Assignee: Riverbed Technology, Inc., San Francisco, CA (US)

( * ) Notice: Subject to any disclaimer, the term of this patent is extended or adjusted under 35 U.S.C. 154(b) by 394 days.

(21) Appl. No.: 13/074,923

(22) Filed: Mar. 29, 2011

(51) Int. Cl.
*H04L 12/26* (2006.01)

(52) U.S. Cl.
USPC .......................................................... 370/230

(58) Field of Classification Search
None
See application file for complete search history.

(56) References Cited

U.S. PATENT DOCUMENTS

| | | | | |
|---|---|---|---|---|
| 7,292,531 | B1 * | 11/2007 | Hill | 370/230.1 |
| 7,426,184 | B2 * | 9/2008 | Vaananen | 370/235 |
| 7,551,623 | B1 * | 6/2009 | Feroz et al. | 370/395.21 |
| 7,606,154 | B1 * | 10/2009 | Lee | 370/232 |
| 7,664,048 | B1 * | 2/2010 | Yung et al. | 370/253 |
| 2005/0213586 | A1 * | 9/2005 | Cyganski et al. | 370/395.41 |
| 2006/0239188 | A1 * | 10/2006 | Weiss et al. | 370/229 |
| 2007/0121504 | A1 * | 5/2007 | Hellenthal et al. | 370/230 |
| 2007/0133409 | A1 * | 6/2007 | McKinnon et al. | 370/230 |
| 2007/0153690 | A1 * | 7/2007 | Stanwood et al. | 370/230 |
| 2009/0116384 | A1 * | 5/2009 | Kim et al. | 370/230 |
| 2009/0207731 | A1 * | 8/2009 | Carlson et al. | 370/232 |
| 2010/0271942 | A1 * | 10/2010 | Weiss et al. | 370/230 |
| 2012/0106342 | A1 * | 5/2012 | Sundararajan et al. | 370/235 |

* cited by examiner

*Primary Examiner* — Anh-Vu Ly
(74) *Attorney, Agent, or Firm* — Park, Vaughan, Fleming & Dowler LLP; Laxman Sahasrabuddhe

(57) ABSTRACT

An edge network device controls the quality-of-service of incoming network traffic flows by limiting the bandwidth of incoming network traffic flows. To ensure that incoming network traffic classes quickly converge to the desired bandwidth allocations, the maximum bandwidth allocation to each network traffic class is dynamically varied based on current overall usage. The maximum bandwidth allocated to each traffic class at any given moment is the sum of its minimum guaranteed bandwidth and a portion of the available excess bandwidth. Each traffic class' portion of the excess bandwidth is proportional to the ratio between its minimum guaranteed bandwidth and the sum of all traffic classes' minimum guaranteed bandwidths. Phantom network packets equivalent to the difference between each traffic class' allocated and actual bandwidth may be added to its scheduling queue to implement this dynamic variation. Phantom packets occupy transmission slots during packet scheduling and are discarded when selected for transmission.

20 Claims, 9 Drawing Sheets

200

300

375

QUALITY OF SERVICE FOR INBOUND NETWORK TRAFFIC FLOWS

BACKGROUND

The invention relates to the field of network devices and to systems and methods for allocating network bandwidth between multiple network traffic flows. Network devices enable data communications between two or more information processing devices, such as client and server computers and other electronic devices. Data communications may be conducted over wired and/or wireless network interfaces. Typically, data is partitioned into packets, which are then communicated via one or more network devices to one or more destination clients.

Any set of related packets is referred to as a network traffic flow. A network traffic flow may include all of the packets associated with a specific source and/or destination device, group of devices, or category of devices. A network traffic flow may include all of the packets associated with a specific application, type of application, or type of data. A network traffic flow may include all of the packets associated with a specific network protocol, network address, network port, or a group of network addresses and/or network ports. A network traffic flow may also include any combination of packets associated as described above and/or according to any arbitrary criteria.

Edge network devices are network devices that connect a local-area network (LAN) to a wide-area network (WAN), such as the internet. Example edge network devices include network routers, switches, gateways, firewalls, and WAN optimization devices. Edge network devices may handle packets generated by and directed to large numbers of source and destination devices over the same interface. For example, an edge network device may process network traffic flows passing between a wide-area network (WAN) and multiple source and destination devices on a local-area network (LAN). The bandwidth or data communications capacity of a WAN limits the amount of data or the rate of network packets that can be sent or received by a LAN through an edge network device.

If the bandwidth limit of a WAN, edge network device, and/or any other intervening network device is reached or exceeded by network traffic flows, packets may be delayed or dropped. Depending on the type of data being communicated over the network, these traffic disruptions may adversely affect the performance of applications on a client network. For example, clients receiving voice or streaming video data may be adversely affected by even small delays or losses of packets.

Because of the limits on network device bandwidth, many edge network devices include quality of service (QoS) functionality and QoS policies enabled by this functionality. QoS functionality enables network devices to prioritize between different network traffic classes and flows in allocating bandwidth. QoS policies allow network administrators to provide different priorities for different network traffic classes and flows based on factors such as the associated source, destination, user, application, or data type. One type of QoS policy enables administrators to specify a minimum guaranteed bandwidth value for a network traffic flow. Other QoS policies may include a maximum latency or delay, maximum error rate, or maximum packet dropping rate for a network traffic flow. A scheduler in an edge networking device prioritizes packets of network traffic flows to implement the desired QoS policies.

QoS policies are only relevant and necessary when two or more network traffic flows are competing for link bandwidth. Competition for network bandwidth occurs at network bottlenecks or points of congestion, where the available bandwidth for network traffic flows decreases. A change in available bandwidth can arise due to physical constraints, such as an interconnection between two physical layers with differing bandwidths, and/or due to logical constraints, such as a service policy enforcing a reduced bandwidth on a wide-area network link.

A network device that is a bottleneck or point of congestion for network traffic flows is a natural place to implement QoS. By acting as a point of congestion for network traffic flows, the network device effectively controls the rate of all network traffic flows that pass through it. For example, with outgoing network traffic flows, where the network traffic flow originates at the LAN and passes through an edge network device to a WAN, an edge network device is often a natural bottleneck, because the bandwidth of the WAN is much less than that of the LAN.

In some applications, it is useful to implement QoS in a network device that is not a bottleneck. It is straightforward to move a bottleneck "upstream" of an existing bottleneck, where "upstream" means in the direction of the greater bandwidth.

However, for incoming network traffic flows, where the network traffic flow passes from a WAN through an edge network device to a LAN on its way to destination devices, the edge network device may not be the bottleneck for these traffic flows. For example, one or more upstream network devices, such as other edge network devices transferring network traffic flows from their source devices to the WAN, may operate as network traffic bottlenecks. Because upstream network devices may act as network traffic flow bottlenecks, it is difficult for edge network devices to make incoming network traffic flows conform to its desired QoS. Additionally, these upstream network devices may be configured to provide QoS functionality that hinders or contradicts the edge device's desired QoS functions.

SUMMARY

Embodiments of the invention control the control the quality-of-service of incoming network traffic flows using an edge network device by limiting the bandwidth of incoming network traffic flows to slightly less than the maximum bandwidth of the incoming network connection. This shifts the network bottleneck to the edge network device for incoming network traffic flows and thus enables this device to controls their quality-of-service.

To ensure that incoming network traffic classes quickly converge to the desired bandwidth allocations, embodiments of the invention dynamically vary the maximum bandwidth allocation to each network traffic class based on current overall usage. The maximum bandwidth allocated to each traffic class at any given moment is the sum of its minimum guaranteed bandwidth and a portion of the available excess bandwidth made available by link sharing. In an embodiment, each traffic class receives a portion of excess bandwidth in proportion to the ratio between its minimum guaranteed bandwidth and the sum of all traffic classes' minimum guaranteed bandwidths.

In an embodiment, the dynamic variation of the each network traffic class' maximum bandwidth allocation may be implemented through the use of phantom network packets. In this embodiment, the edge network device determines the difference between each network traffic class' current bandwidth usage and its maximum available bandwidth allocation. Phantom packets equivalent to this difference in bandwidth are added to the traffic class' packet scheduling queue. These phantom packets act as placeholders during the scheduling of queued network packets. Although phantom packets are not actually transmitted, the bandwidth and transmission slot allocated to these phantom packets by the scheduler are not reassigned to any other traffic classes.

From the perspective of the packet scheduler, phantom packets make it appear that every network traffic class is consuming more than the bandwidth it is effectively consuming at a given time. Thus, phantom packets prevent any other network traffic classes from using the excess available bandwidth of this network traffic class. The use of phantom packets allows each network traffic class to use any amount of bandwidth up to its current upper bandwidth limit. However, phantom packets prevent any network traffic class from exceeding its upper bandwidth limit, even if other active network traffic classes have unused bandwidth available.

BRIEF DESCRIPTION OF THE DRAWINGS

The invention will be described with reference to the drawings, in which.

DETAILED DESCRIPTION

Figure 1A:
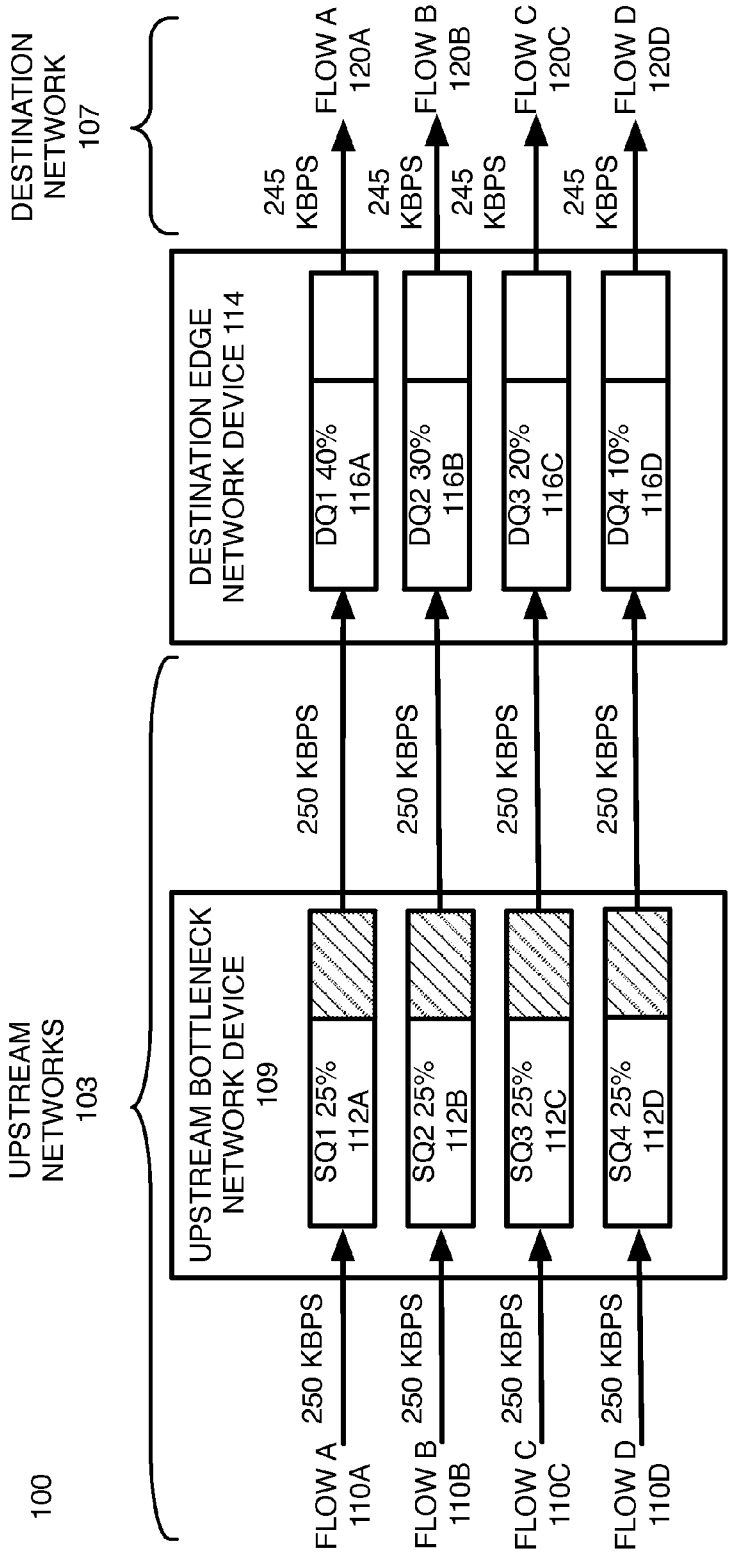
FIGS. 1A-1D illustrate an example technique for controlling the quality-of-service of incoming network traffic flows using an edge network device.

Embodiments of the invention control the quality-of-service of incoming network traffic flows using an edge network device by limiting the bandwidth of incoming network traffic flows to less than the maximum bandwidth of the incoming WAN connection. By limiting the bandwidth of incoming network traffic flows to less than the maximum bandwidth of the incoming WAN connection, the edge network device acts as a bottleneck for incoming network traffic flows and thus can control their quality-of-service. To maximize throughput, the edge network device typically limits its incoming network traffic flow bandwidth to slightly less than the maximum bandwidth of the incoming WAN connection, such as 98% of the bandwidth of the incoming WAN connection.

However, limiting the maximum bandwidth at an edge network device can increase queue sizes and delays for incoming network traffic. For example, if the network traffic occurs in short, irregular bursts, these episodic bursts will cause queue buildups at the edge network device. One way to alleviate these queue buildups is to further decrease the limit on incoming network traffic flow bandwidth. Unfortunately, this wastes additional bandwidth and decreases overall network performance.

When the edge network device limits the bandwidth of incoming network traffic flows to less than the maximum bandwidth of the incoming WAN connection, the incoming network traffic flows may eventually converge to the bandwidth allocations specified by the edge network device's QoS functionality, depending on the network protocol and network traffic characteristics. For example, FIGS. 1A-1D illustrate an example technique for controlling the quality-of-service of incoming network traffic flows using an edge network device.

In the example of FIGS. 1A-1D, upstream networks 103 are connected with a destination LAN 107. Upstream networks 103 can include a wide-area network, a service provider's access network, and/or one or more local-area networks associated with sources of incoming network traffic. In general, upstream networks are any networks through which incoming network traffic passes prior to reaching a destination LAN 107. In this example, four network traffic flows 110 originate or pass through the upstream networks 103 and are directed to the destination LAN 107. In this example, these network traffic flows use TCP, though embodiments of the invention may be applied to other types of network protocols. These four network traffic flows 110 pass through an upstream bottleneck network device 109 in the upstream networks 103 on their way to destination edge network device 114, and then on to their destinations on destination LAN 107. The upstream bottleneck network device 109 may be located anywhere within the upstream networks 103.

In this example of FIGS. 1A-1D, the upstream bottleneck network device 109 attempts to allocate equal bandwidth to each of four network traffic flows, resulting in a desired bandwidth allocation of 25% for each network traffic flow. However, the destination edge network device 114 desires a minimum guaranteed bandwidth allocation of 40%, 30%, 20%, and 10% to network traffic flows 110A, 110B, 110C, and 110D, respectively. Additionally, the destination edge network device 114 provides link sharing to network traffic flows 110, so that allocated bandwidth unused by one network traffic flow may be reallocated as needed to other network traffic flows. For example, the destination edge network device may have a link-sharing policy that distributes unused bandwidth to backlogged classes of the network traffic flows proportionally to the ratio of their guaranteed bandwidths. Embodiments of the invention may be used with any type of link sharing policy.

To override the bandwidth allocation of the upstream bottleneck network device 109 and control the quality-of-service of the network traffic flows 110, the destination edge network device 114 limits its incoming network traffic flow bandwidth to slightly less than the maximum bandwidth of the incoming WAN connection, such as 98% of the bandwidth of the incoming WAN connection in this example. As described below, this causes the data rates of the incoming network traffic flows to eventually converge to the minimum guaranteed values desired by the destination edge network device 114.

FIG. 1A illustrates an initial phase 100 of this example technique for controlling the quality-of-service of incoming network traffic flows. In this example, the initial phase 100 begins with the network traffic flows 110 being initiated at the source and being queued somewhere within the upstream networks 103 by the upstream bottleneck network device 109. In this example, the network traffic flows 110A are received by the upstream bottleneck network device 109 at a data rate of 250 kbps each. The upstream bottleneck network device 109 assigns the network traffic flows to separate queues 112.

In this example, all of the queues 112 are initially backlogged due to the slow-start mechanism in the TCP protocol used to avoid network congestion. During slow-start, a sender may send two new network packets for every acknowledged network packet; this enables the sender to send packets at up to twice the bottleneck bandwidth during slow start. For example, if the incoming bandwidth of destination edge network device 114 is limited to 98% of the incoming network bandwidth, the incoming WAN connection may receive bursts of up to 196% of this bandwidth for slow-starting network traffic flows. This results in queues of backlogged network traffic flows forming in queues 112 at upstream bottleneck network device 109. This is visually indicated in FIGS. 1A-1D by the cross-hatched shading of queues 112. In this example, if the upstream network bandwidth is 1 mbps and the queues 112 are serviced using a fair queuing scheduler, then the upstream bottleneck network device 109 outputs each of the network traffic flows through the upstream networks 103 towards the destination edge network device 114 at a data rate of 250 kbps.

Upon receiving network traffic flows 110 via the upstream networks 103, the destination edge network device 114 forwards these network traffic flows to their destinations as destination network traffic flows 120. Initially, the destination edge network device 114 will output all of the destination network traffic flows 120 at the same data rate, which in this example is approximately 245 kbps. This occurs because all of the network traffic flows 110 are backlogged at the upstream bottleneck network device 109, rather than the destination edge network device.

Eventually, one or more of the incoming network traffic flows become backlogged at the destination edge network device 114. This is due to the destination edge network device 114 its incoming network traffic flow bandwidth to slightly less than the maximum bandwidth of the incoming WAN connection. In this example, the destination edge network device 114 limits its incoming network traffic flow bandwidth to 98% of the bandwidth of the incoming upstream networks 103.

Figure 1B:
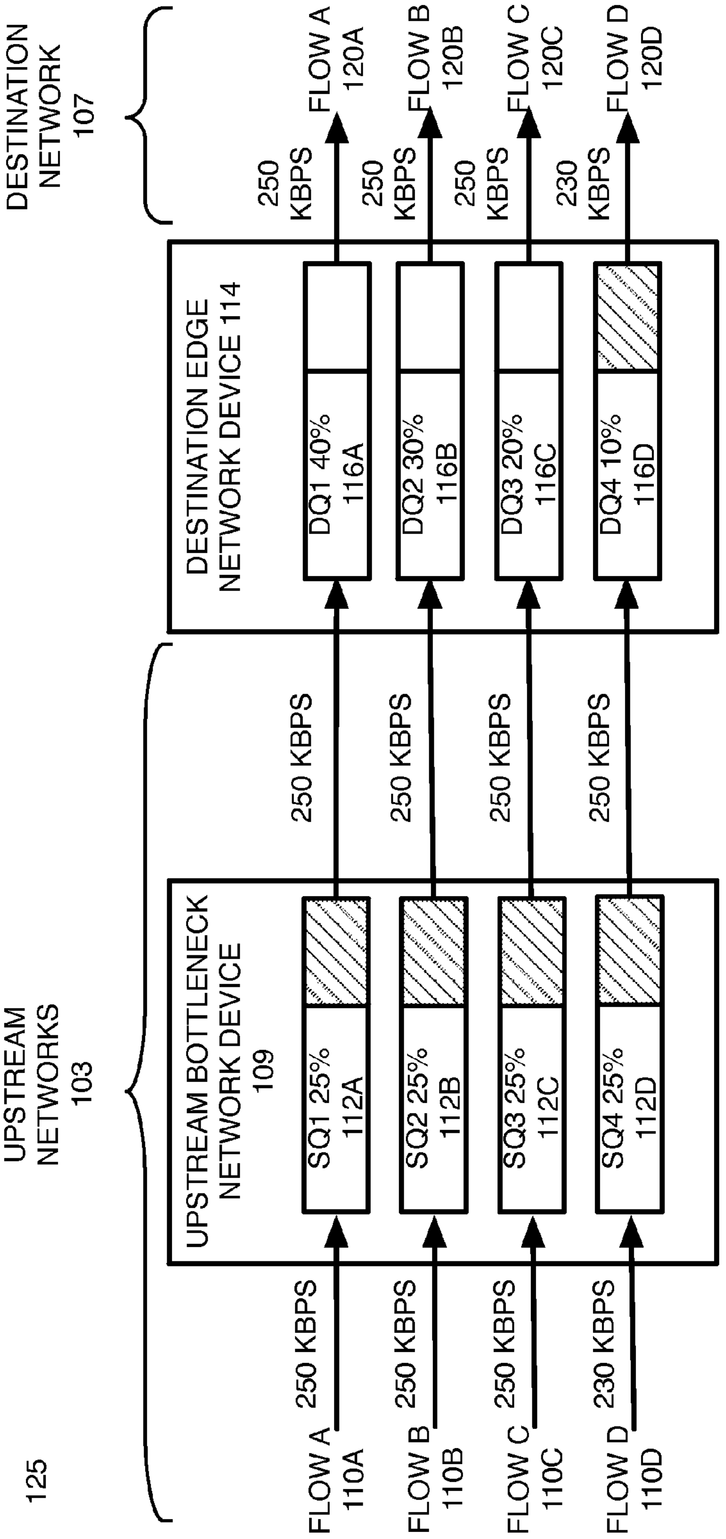

In this example, the first network traffic flow to become backlogged at the destination edge network device 114 is network traffic flow D 110D. FIG. 1B illustrates a second phase 125 of this example technique for controlling the quality-of-service of incoming network traffic flows at a destination edge network device. In this phase, the network traffic flow 110D is the first incoming network traffic flow to become backlogged at the destination edge network device 114, because the destination edge network device 114 has assigned this network traffic flow the least amount of guaranteed bandwidth. The destination edge network device 114 buffers the network traffic flow 110D in destination queue 116D. The other queues 116A, 116B, and 116D of the destination edge network device 114 remain empty, as network traffic flows 110A, 110B, and 110C are serviced immediately by the destination edge network device 114.

As a result of the backlog of network traffic flow 110D at the destination edge network device 114, the destination network traffic flow 120D, corresponding with network traffic flow 110D, operates at a reduced bandwidth of 230 kbps in this example. This reduction in the destination network traffic flow 120D will reduce the data rate of additional data in network traffic flow to the upstream bottleneck network device 109 to 230 kbps as well. However, the upstream bottleneck network device 109 will continue to output queued data from queue 112D at 250 kbps, which is the maximum allocated bandwidth of the upstream networks 103. Thus, queue 112D in upstream bottleneck network device 109 will gradually empty, transferring the entire backlog for network traffic flow 110D to destination queue 116D in the destination edge network device 114. This transfer of the queue backlog from the upstream bottleneck network device 109 to the destination edge network device 114 occurs in this example at a rate of 20 kbps, which is the difference between the WAN bandwidth allocated to this network traffic flow 110D and the bandwidth limit imposed by the destination edge network device 114.

Figure 1C:
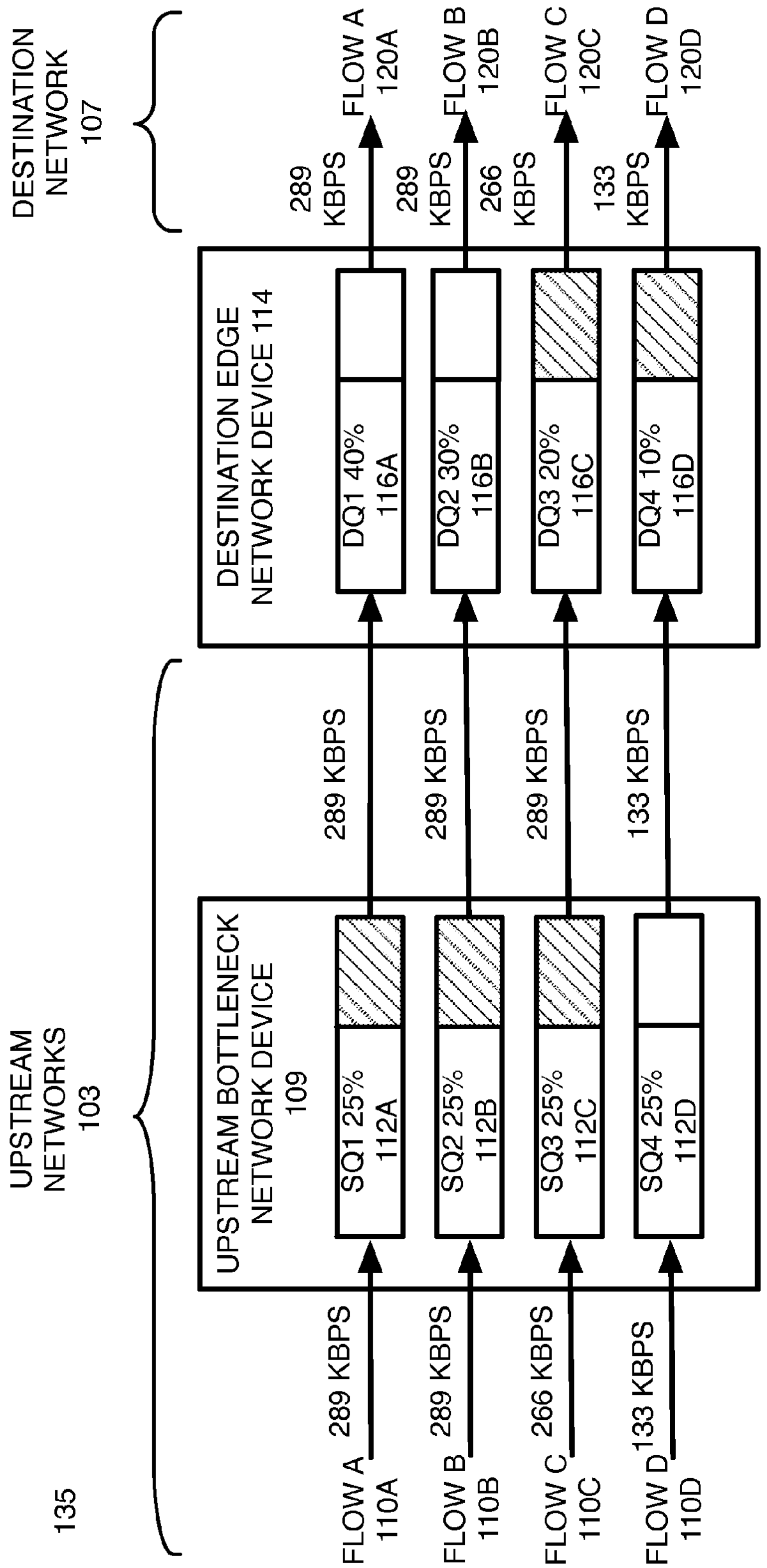

Similarly, additional network traffic flows will begin to be backlogged at the destination edge network device 114. FIG. 1C illustrates a third phase 135 of this example technique for controlling the quality-of-service of incoming network traffic flows at a destination edge network device. In this phase, the network traffic flow 110C is the second incoming network traffic flow to become backlogged at the destination edge network device 114, because the destination edge network device 114 has assigned this network traffic flow the second least amount of guaranteed bandwidth.

The destination edge network device 114 buffers the network traffic flow 110C in destination queue 116C. The other queues 116A and 116B of the destination edge network device 114 remain empty, as network traffic flows 110A, and 110B are serviced immediately by the destination edge network device 114.

In this example of the third phase 135, the queue 112D associated with network traffic flow 110D in the upstream bottleneck network device 109 is now empty. Thus, the network traffic flow 110D is now entirely backlogged in destination queue 116D at the destination edge network device 114. As a result, the destination edge network device 114 is in sole control of the quality of service for the network traffic flow 110D. In this example, the destination edge network device 114 outputs network traffic flow 120D at a data rate of 133 kbps.

As a result of the backlog of network traffic flow 110C at the destination edge network device 114, the destination network traffic flow 120C operates at a reduced data rate of 266 kbps in this example, as compared with a data rate of 289 kbps for corresponding network traffic flow 110C over the upstream networks 103. Thus, queue 112C in upstream bottleneck network device 109 will gradually empty, transferring the entire backlog for network traffic flow 110C to destination queue 116C in the destination edge network device 114. This transfer of the queue backlog from the upstream bottleneck network device 109 to the destination edge network device 114 occurs in this example at a rate of 23 kbps, which is the difference between the WAN bandwidth allocated to this network traffic flow 110C and the bandwidth limit imposed by the destination edge network device 114.

In the third phase 135, the data rates for network traffic flows 120 are closer to the desired minimum guaranteed bandwidth allocations specified by the destination edge network device, as compared with the first 100 and second 125 phases, but have not yet stabilized to the desired minimum guaranteed bandwidth allocations. As time progresses, the remaining network traffic flows 110B and then 110A will begin to be backlogged at the destination edge network device 114. As described above, once a network traffic flow is backlogged at the destination edge network device 114, one of the upstream bottleneck network device queues 112 associated with this network traffic flow will begin to empty as its contents are transferred to the corresponding one of the queues 116 in the destination edge network device.

Figure 1D:
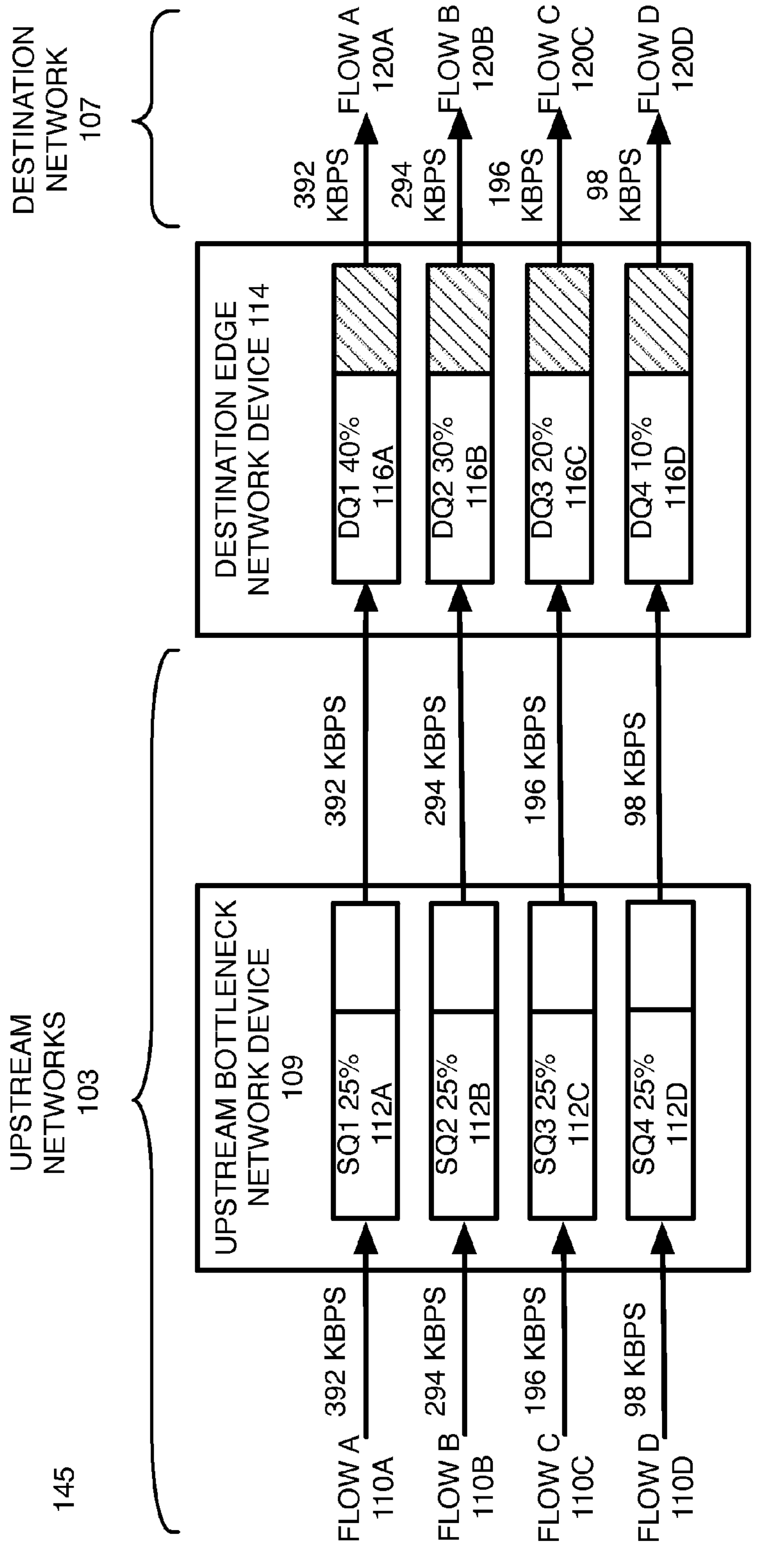

FIG. 1D illustrates a fourth phase 145 of this example technique for controlling the quality-of-service of incoming network traffic flows at a destination edge network device. In this phase 145, all of the network traffic flows 110 are backlogged at the destination edge network device 114 and the associated queues 112 at the upstream bottleneck network device 109 are empty. Thus, the destination edge network device 114 operates as the sole bottleneck for incoming network traffic flows and thus can control their quality of service. In this phase 145, the data rates of network traffic flows 120 have finally converged to the minimum guaranteed bandwidth allocation desired by the destination edge network device 114. In this example, network traffic flows 120A, 120B, 120C, and 120D operate at 40%, 30%, 20%, and 10%, respectively, of the incoming bandwidth of the destination edge network device 114.

As illustrated by the example of FIGS. 1A-1D, by limiting the bandwidth of incoming network traffic flows at the destination edge network device to less than the maximum bandwidth of the incoming WAN connection, the incoming network traffic flows eventually converge to the minimum guaranteed bandwidth allocations specified by the destination edge network device's QoS functionality. However, this convergence can take several seconds to several minutes to complete. One approach to decreasing the convergence time is to further reduce the bandwidth of incoming network traffic flows at the destination edge network device. This increases the rate at which the queues at the upstream bottleneck network device 109 empty and transfer to the destination edge network device, but reduces network performance. Another approach is to disable link sharing, but this means that any bandwidth allocated to a network traffic flow that is unused cannot be reallocated to any other network traffic flow and thus will be wasted.

An embodiment of the invention decreases the convergence time for incoming network traffic flows to reach the destination edge network device's desired minimum guaranteed bandwidth allocations by dynamically varying the maximum bandwidth allocation to each network traffic class based on current overall usage.

Figure 2:
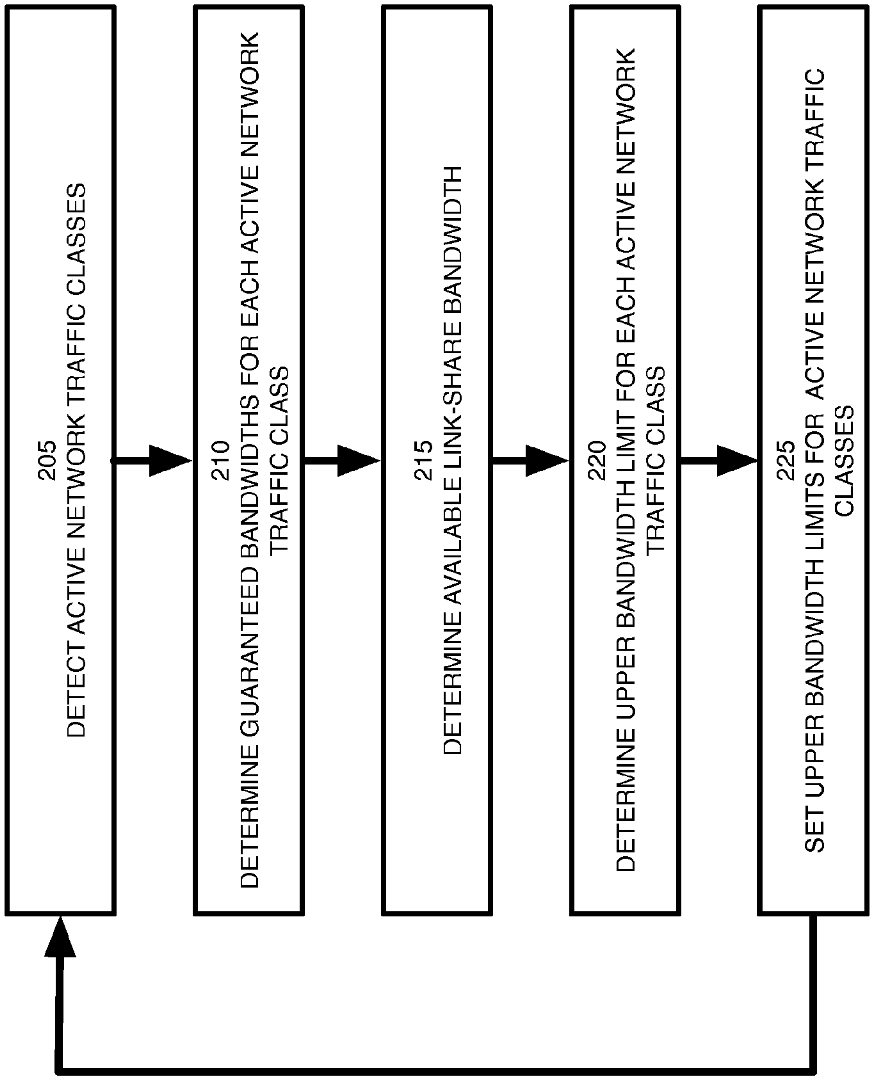
FIG. 2 illustrates a method of controlling the quality-of-service of incoming network traffic flows using an edge network device according to an embodiment of the invention.

FIG. 2 illustrates a method 200 of controlling the quality-of-service of incoming network traffic flows and their respective traffic classes using an edge network device according to an embodiment of the invention. Step 205 detects one or more active incoming network flows to the destination edge network device. A network traffic flow may be identified based on packets having a common source and/or destination device, group of devices, or category of devices; a common application, type of application, or type of data; an association with a specific network protocol, network address, network port, or a group of network addresses and/or network ports; and/or any combination these attributes and/or any arbitrary criteria. One or more network traffic flows may be included and/or active within a network traffic class.

Step 210 determines minimum guaranteed bandwidth allocations for each of the active network traffic classes. In an embodiment, minimum guaranteed bandwidth allocations for different types of network traffic classes may be specified by a user or administrative application as part of the configuration of a destination edge network device. Embodiments of the invention may specify minimum guaranteed bandwidth allocations in terms of a specific data rate (for example in kbps) and/or as a percentage of total available bandwidth. In another embodiment, the minimum guaranteed bandwidth may be specified for both individual network traffic flows and for the traffic class in aggregate.

Step 215 determines the available link share bandwidth. The available link share bandwidth is the amount of bandwidth available after the minimum guaranteed bandwidth for the active network traffic classes has been allocated. For example, if there are currently two active network traffic classes each allocated a minimum guaranteed bandwidth of 30% of the total bandwidth, then the available link share bandwidth is equal to 40% (100%-30%-30%) of the total bandwidth. In an embodiment, the available link share bandwidth is equal to the difference between the total bandwidth and the minimum guaranteed bandwidths of the active network traffic classes.

Step 220 determines an upper bandwidth limit for each of the active network traffic classes. The upper bandwidth limit limits the amount of bandwidth above the minimum guaranteed bandwidth that the network traffic class may use. In an embodiment, the upper bandwidth limit (UBW) of an active network traffic class i is specified as follows:

$$UBW_i = GBW_i + LSBW\frac{GBW_i}{GBW_{TOTAL}}$$

where $GBW_i$ is the minimum guaranteed bandwidth allocated to a network traffic class i, LSBW is the total available link share bandwidth, and $GBW_{TOTAL}$ is the sum of the minimum guaranteed bandwidth values for all of the currently active network traffic classes. For example, if there are only first and second active network traffic classes, allocated minimum guaranteed bandwidth values of 40% and 10%, respectively, the upper bandwidth limit for the first network traffic class is 80% (0.4+0.5(0.4/0.5)) and for the second network traffic class is 20% (0.1+0.5(0.1/0.5)). In another example, if there are three active network traffic classes allocated minimum guaranteed bandwidths of 40%, 30%, and 10%, respectively, then the upper bandwidth limit for the first network traffic class is 50% (0.4+0.2(0.4/0.8)), for the second network traffic class is 37.5% (0.3+20.(0.3/0.8)), and for the third network traffic class is 12.5% (0.1+0.2(0.1/0.8)).

Step 225 sets the upper bandwidth limit for each of the active network traffic classes to the corresponding value determined in step 220. In one embodiment, a destination edge network device can directly set dynamic upper bandwidth limits for active network traffic classes. In another embodiment, a destination edge network device may use phantom network packets, described in detail below, to impose dynamically determined upper bandwidth limits on active network traffic classes. Regardless of the implementation, the upper bandwidth limit for each active network traffic class inhibits the scheduler from providing bandwidth above this limit to the class.

Following step 225, method 200 may return to step 205 if new active network traffic classes are detected or a previously active network traffic class becomes dormant. Steps 205 to 225 may be repeated to determine upper bandwidth limits for the updated set of active network traffic classes. Method 200 may also be repeated if the allocation of minimum guaranteed bandwidth values to network traffic classes are changed by a user or administrative application.

Figure 3A:
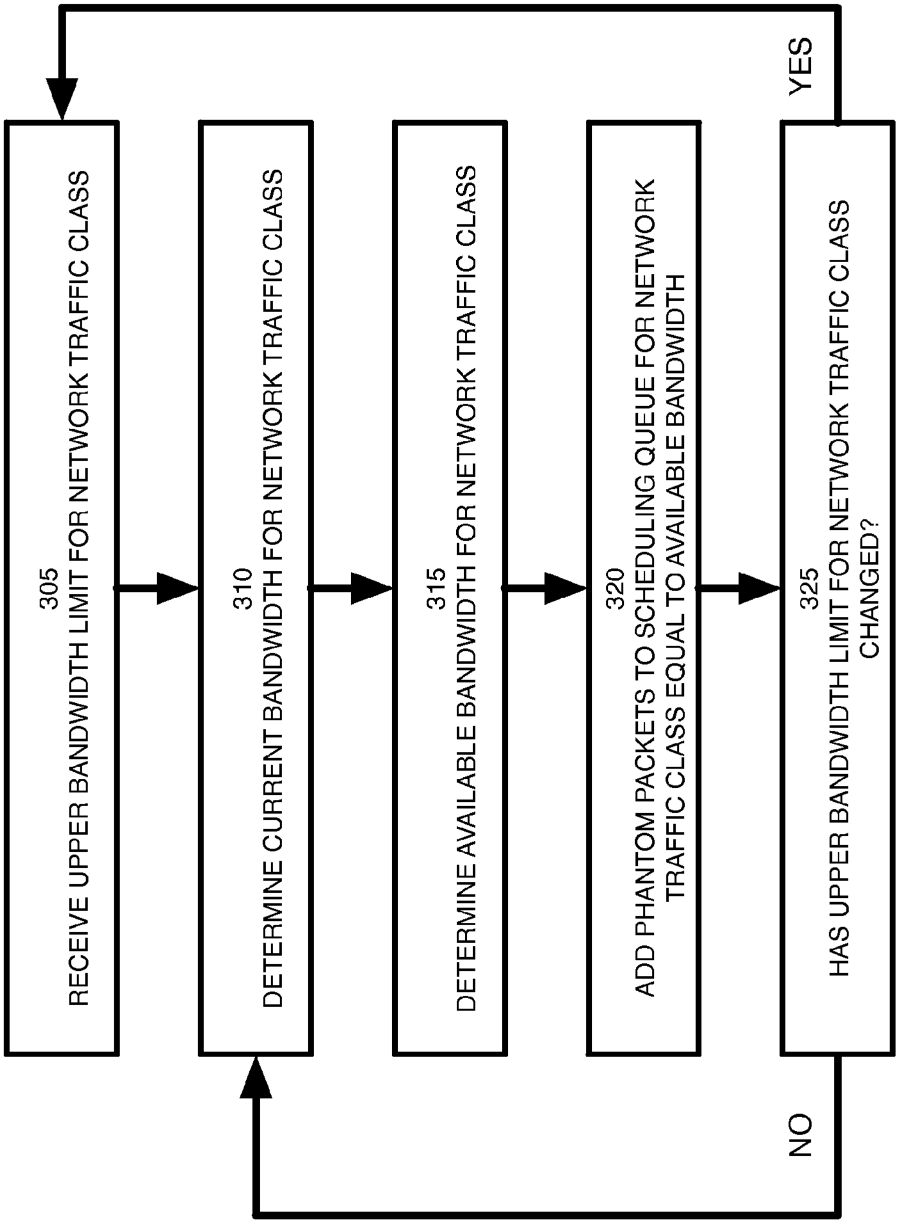
FIGS. 3A-3C illustrate a method of implementing the control of the quality-of-service of incoming network traffic flows using an edge network device according to an embodiment of the invention.
Figure 3B:
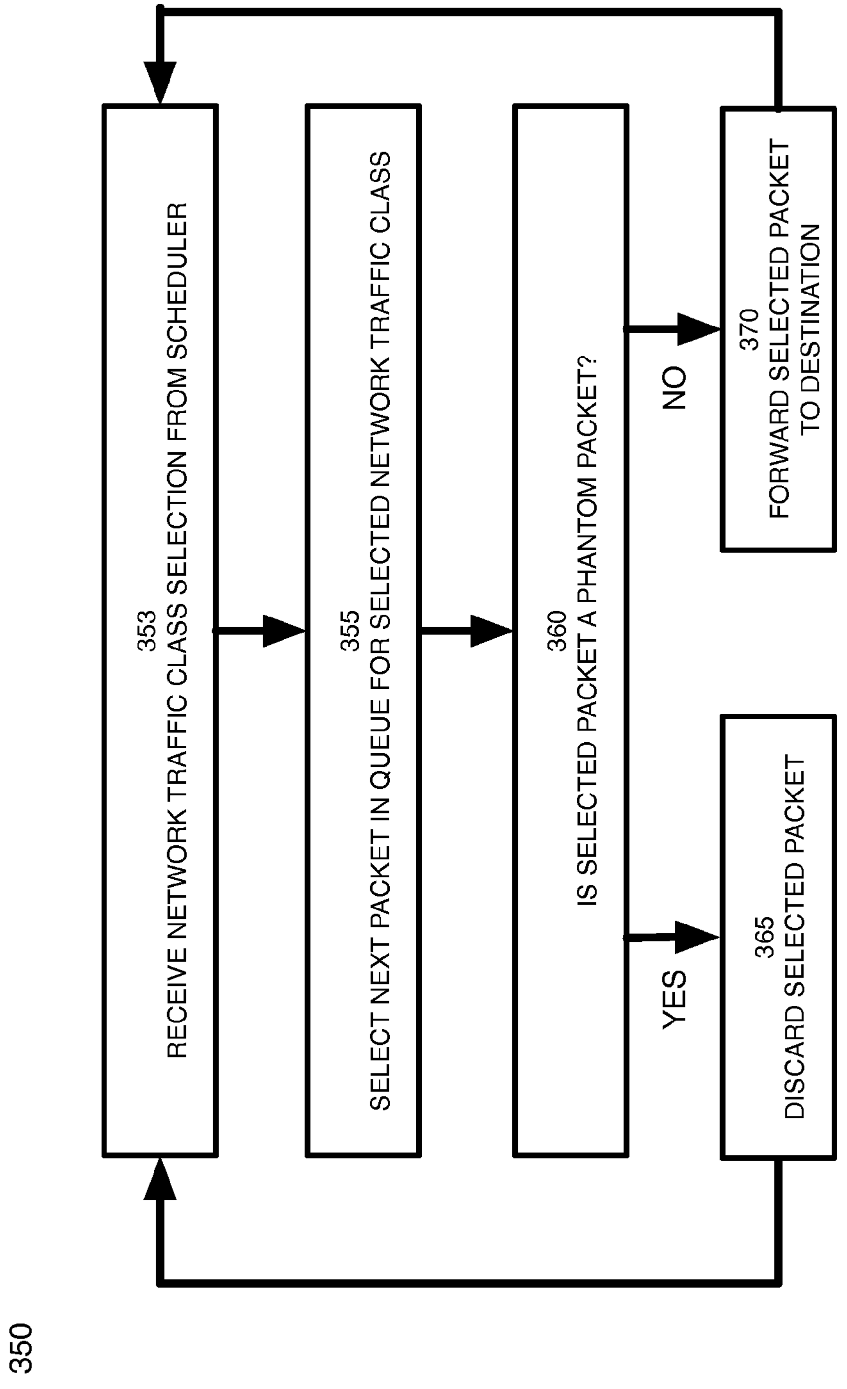

As described above, a destination edge network device may implement dynamically determined upper bandwidth limits using phantom network packets. This enables embodiments of the invention to be implemented in network devices using a variety of different types of scheduling techniques without substantial modifications to the scheduler architecture. FIGS. 3A-3B illustrate methods of implementing the control of the quality-of-service of incoming network traffic flows using phantom network packets according to an embodiment of the invention.

FIG. 3A illustrates a method 300 for dynamically setting an upper bandwidth limit for a network traffic class according to an embodiment of the invention. Method 300 begins with step 305 receiving an upper bandwidth limit for a network traffic class. In an embodiment, step 305 may receive an upper bandwidth limit for a network traffic class from step 225 in method 200 above.

Step 310 determines the current bandwidth usage for the network traffic class. In an embodiment, step 310 determines the current bandwidth usage from the rate that packets associated with the network traffic class leave the destination edge network device and/or the size the backlog in the queue associated with the network traffic class in the destination edge network device.

Step 315 determines the available bandwidth for the network traffic class. In an embodiment, the available bandwidth is the difference between the desired upper bandwidth limit for the network traffic class and its current bandwidth usage.

Step 320 adds phantom packets to the scheduling queue to reserve bandwidth for this network traffic class. Phantom packets have attributes such as a fictitious packet size, but do not carry any actual data. Nonetheless, the phantom packet are queued and scheduled for transmission in a similar manner as actual packets. As described in detail below, once a phantom packet is selected for transmission by a scheduler, it is discarded.

Although phantom packets are not actually transmitted, the bandwidth and transmission slot allocated to these phantom packets by the scheduler are not reassigned to any other packets. From the perspective of the packet scheduler, phantom packets make it appear that every network traffic class is operating at exactly its current upper bandwidth limit. Thus, phantom packets prevent any other network traffic classes from using any of the excess available bandwidth of this network traffic class. The use of phantom packets allows each network traffic class to use any amount of bandwidth up to its current upper bandwidth limit. However, phantom packets prevent any network traffic class from exceeding its upper bandwidth limit, even if other active network traffic classes have unused bandwidth available.

In an embodiment, step 320 adds phantom packets to the scheduling queue associated with the network traffic class equal to the available bandwidth. An embodiment of step 320 adds phantom packets to a queue associated with a network traffic class at a data rate equal to the current available bandwidth of the network traffic class. For example, if the upper bandwidth limit of a network traffic class is equal to 250 kbps and the current bandwidth usage of this network traffic class is 220 kbps, then step 320 will add phantom packets to the queue of this network traffic class at a rate of 30 kbps. This makes the network traffic class appear to the scheduler as if it operating at exactly its upper bandwidth limit. In an embodiment, the phantom packets added to network traffic class queues are of similar size as typical actual network packets associated the same traffic class.

Step 325 determines if the upper bandwidth limit associated with the network traffic class has changed. This may occur of a different active network traffic class becomes inactive or a different inactive network traffic class becomes active. If the upper bandwidth limit associated with the network traffic class has changed, method 300 returns to step 305 to receive the new upper bandwidth limit for the network traffic class. If the upper bandwidth limit associated with the network traffic class has not changed, method 300 returns to step 310 to determine the current bandwidth usage for the network traffic class. In an embodiment, steps 310-325 are executed frequently so that phantom network packets do not backlog the network traffic class and prevent the network traffic class from operating up to its current upper bandwidth limit.

FIG. 3B illustrates a method 350 of processing queued network packets according to an embodiment of the invention. Step 353 receives the selection of one network traffic class queue from a network packet scheduler. Embodiments of the invention may be used with any type of network traffic scheduling scheme known in the art, including fixed queuing schemes (such as weighted fair queuing or round-robin); fair queuing schemes; and/hierarchical queuing schemes, such as hierarchical fair service curve scheduling.

In response to receiving the selection of a network traffic class queue, step 355 selects the next network packet in the selected network traffic class queue.

Step 360 determines if the selected network packets is a phantom packet. In an embodiment, the network traffic class queue includes an attribute for each queued packet to indicate whether that queue position is occupied by a phantom packet or an actual network packet. In another embodiment, step 360 identifies phantom packets based on one or more attributes of the queued network packet.

If the selected network packet is a phantom packet, method 350 proceeds to step 365 and discards the selected network packet. In an embodiment, step 365 also removes the selected network packet from the queue associated with the network traffic class. Following step 365, method 350 returns to step 353 to wait for the scheduler to select the network traffic class queue to output another network packet.

Conversely, if the selected network packet is not a phantom packet, method 350 proceeds from step 360 to step 370. Step 370 forwards the selected network packet towards its destination and removes the selected packet from the queue associated with the network traffic class. Following step 370, method 350 returns to step 353 to wait for the scheduler to select the network traffic class queue to output another network packet.

Figure 3C:
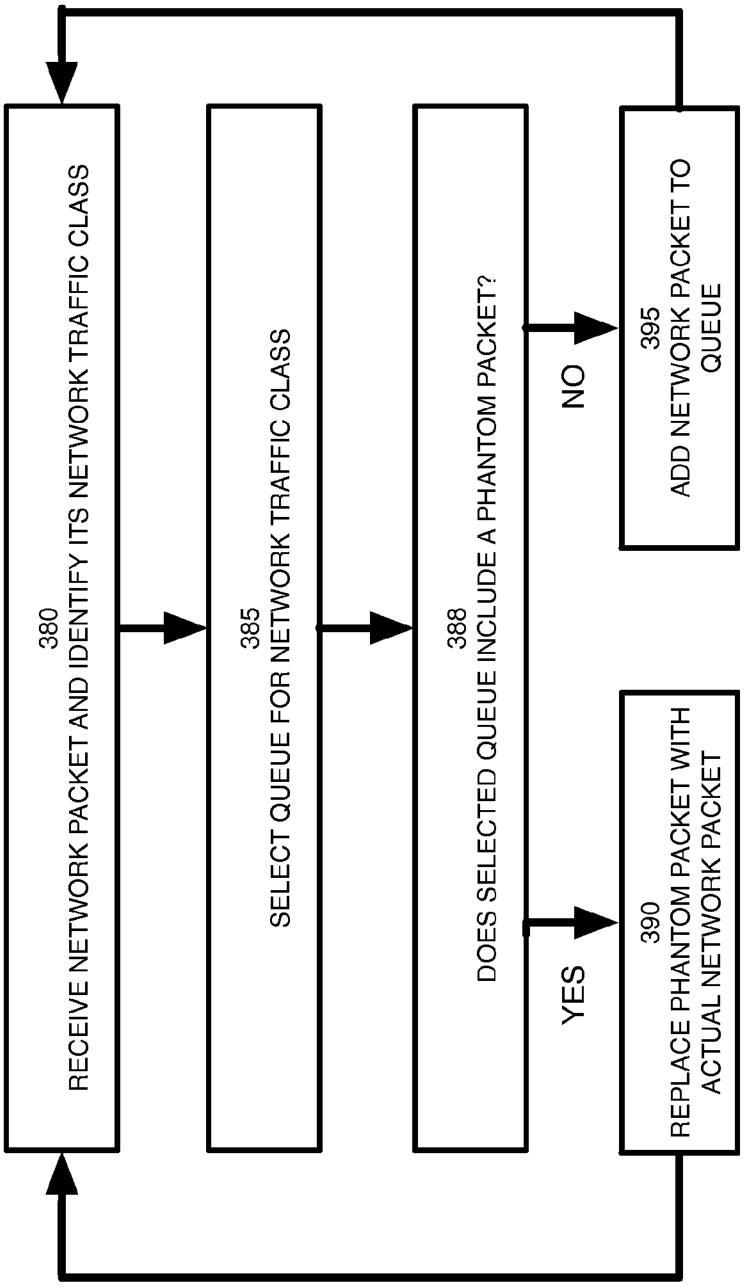

FIG. 3C illustrates a method 375 of adding network packets to traffic class queues according to an embodiment of the invention. Step 380 receives a network packet from the upstream network and identifies the traffic class that this network packet should be assigned to. Embodiments of the invention may assign network packets to traffic classes based on any attribute or combination of attributes, including an associated source and/or destination device, group of devices, or category of devices; an associated application, type of application, or type of data; and an association with a specific network protocol, network address, network port, or a group of network addresses and/or network ports.

Step 385 selects one of the traffic class queues at the destination edge network device matching the traffic class associated with the received network packet. Step 388 determines if the selected traffic class queue includes any phantom network packets. If so, then method 375 proceeds to step 390 and replaces the first one of these phantom network packets in the selected queue with the actual network packet received in step 380. Conversely, if the selected queue does not include any phantom packets, step 395 adds the received network packet to the end of the selected queue.

Figure 4:
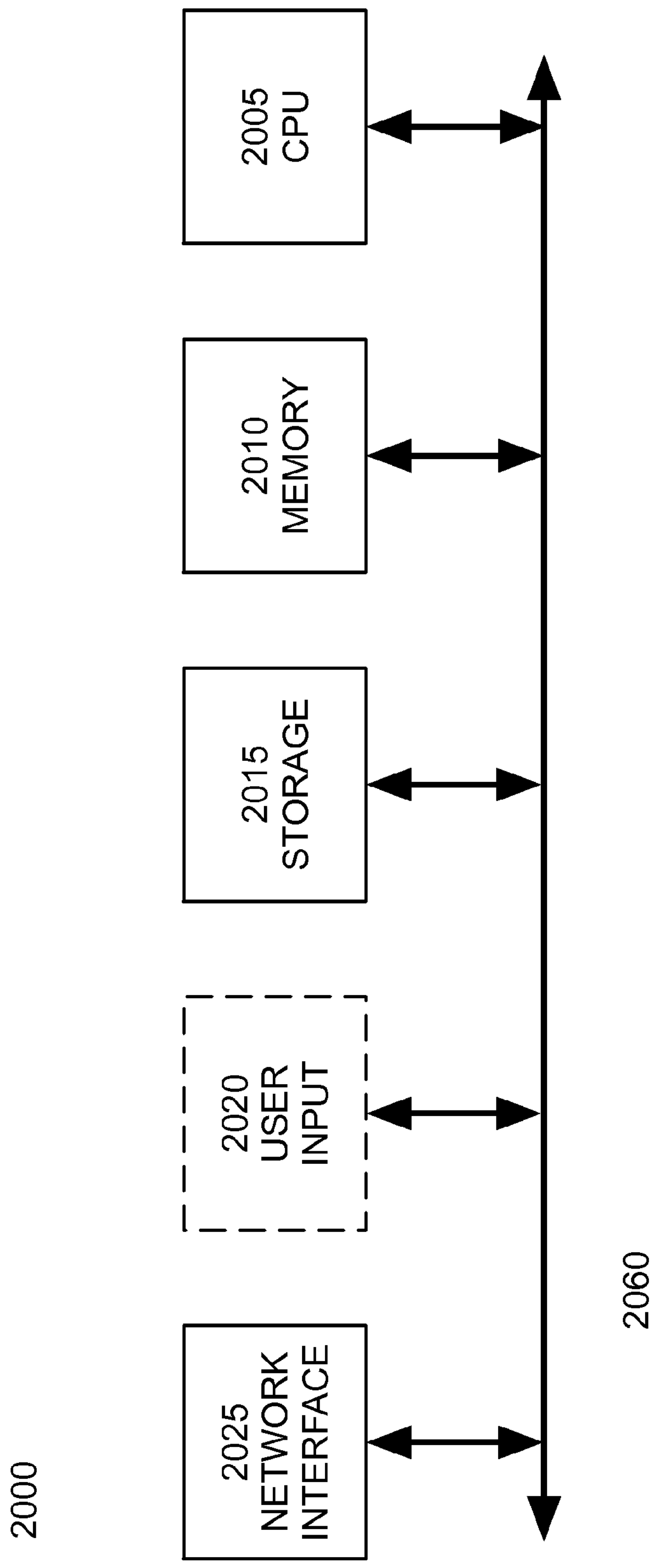
FIG. 4 illustrates a computer system suitable for implementing embodiments of the invention.

FIG. 4 illustrates a computer system suitable for implementing embodiments of the invention. FIG. 4 is a block diagram of a computer system 2000, such as a personal computer or other digital device, suitable for practicing an embodiment of the invention. Embodiments of computer system 2000 may include dedicated networking devices, such as wireless access points, network switches, hubs, routers, hardware firewalls, WAN and LAN network traffic optimizers and accelerators, network attached storage devices, storage array network interfaces, and combinations thereof.

Computer system 2000 includes a central processing unit (CPU) 2005 for running software applications and optionally an operating system. CPU 2005 may be comprised of one or more processing cores. Memory 2010 stores applications and data for use by the CPU 2005. Examples of memory 2010 include dynamic and static random access memory. Storage 2015 provides non-volatile storage for applications and data and may include fixed or removable hard disk drives, flash memory devices, ROM memory, and CD-ROM, DVD-ROM, Blu-ray, HD-DVD, or other magnetic, optical, or solid state storage devices.

In a further embodiment, CPU 2005 may execute virtual machine software applications to create one or more virtual processors capable of executing additional software applications and optional additional operating systems. Virtual machine applications can include interpreters, recompilers, and just-in-time compilers to assist in executing software applications within virtual machines. Additionally, one or more CPUs 2005 or associated processing cores can include virtualization specific hardware, such as additional register sets, memory address manipulation hardware, additional virtualization-specific processor instructions, and virtual machine state maintenance and migration hardware.

Optional user input devices 2020 communicate user inputs from one or more users to the computer system 2000, examples of which may include keyboards, mice, joysticks, digitizer tablets, touch pads, touch screens, still or video cameras, and/or microphones. In an embodiment, user input devices may be omitted and computer system 2000 may present a user interface to a user over a network, for example using a web page or network management protocol and network management software applications.

Computer system 2000 includes one or more network interfaces 2025 that allow computer system 2000 to communicate with other computer systems via an electronic communications network, and may include wired or wireless communication over local area networks and wide area networks such as the Internet. Computer system 2000 may support a variety of networking protocols at one or more levels of abstraction. For example, computer system may support networking protocols at one or more layers of the seven layer OSI network model. An embodiment of network interface 2025 includes one or more wireless network interfaces adapted to communicate with wireless clients and with other wireless networking devices using radio waves, for example using the 802.11 family of protocols, such as 802.11a, 802.11b, 802.11g, and 802.11n.

An embodiment of the computer system 2000 may also include one or more wired networking interfaces, such as one or more Ethernet connections to communicate with other networking devices via local or wide-area networks.

The components of computer system 2000, including CPU 2005, memory 2010, data storage 2015, user input devices 2020, and network interface 2025 are connected via one or more data buses 2060. Additionally, some or all of the components of computer system 2000, including CPU 2005, memory 2010, data storage 2015, user input devices 2020, and network interface 2025 may be integrated together into one or more integrated circuits or integrated circuit packages. Furthermore, some or all of the components of computer system 2000 may be implemented as application specific integrated circuits (ASICS) and/or programmable logic.

Further embodiments can be envisioned to one of ordinary skill in the art. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of controlling incoming network traffic to a network device, the method comprising:

identifying, by a network device, first active incoming network traffic classes at a first time;

determining minimum guaranteed bandwidth values for the incoming network traffic classes;

determining available link-share bandwidth for the first incoming network traffic classes at the first time; and allocating first portions of the available link-share bandwidth to the first incoming network traffic classes based on their respective minimum guaranteed bandwidth values, wherein said allocating comprises adding phantom packets to at least a portion of scheduling queues associated with the incoming network traffic classes.

2. The method of claim 1, wherein allocating portions of the available link-share bandwidth comprises:

determining for each of the first incoming network traffic classes a ratio between the minimum guaranteed bandwidth value of the first incoming network traffic class and a sum of the minimum guaranteed bandwidth values for all of the first incoming network traffic classes.

3. The method of claim 2, comprising setting upper bandwidth limits for the first incoming network traffic classes based on their respective minimum guaranteed bandwidth values and allocated first portions of the available link-share bandwidth.

4. The method of claim 1, comprising:

identifying second incoming network traffic classes at a second time;

determining minimum guaranteed bandwidth values for the second incoming network traffic classes;

determining available link-share bandwidth for the incoming network traffic classes at a second time; and allocating second portions of the available link-share bandwidth at the second time to the second incoming network traffic classes based on their respective minimum guaranteed bandwidth values.

5. The method of claim 4, wherein the available link-share bandwidths at the first and second times are different.

6. The method of claim 4, wherein the first incoming network traffic classes and the second incoming network traffic classes are different.

7. The method of claim 1, wherein the first incoming network traffic classes include a TCP traffic flow.

8. The method of claim 1, wherein adding phantom packets comprises:

determining available bandwidths for the first incoming network traffic classes; and adding the phantom packets to at least the portion of the scheduling queues, wherein the phantom packets are equal to the available bandwidths for the first incoming network traffic classes.

9. The method of claim 8, wherein determining the available bandwidths comprises:

determining upper bandwidth limits for the first incoming network traffic classes;

determining current bandwidth usages for the first incoming network traffic classes; and determining differences between the upper bandwidth limits and the current bandwidth usages for the first incoming network traffic classes.

10. The method of claim 1, comprising:

removing packets from the scheduling queues in response to selections of the scheduling queues by a packet scheduler;

identifying a first portion of the removed packets comprising phantom packets;

discarding the first portion of the removed packets;

identifying a second portion of the removed packets comprising packets included in the first incoming network traffic classes; and directing the second portion of the removed packets towards their destination addresses.

11. The method of claim 1, comprising:

receiving additional packets associated with the portion of the first incoming network traffic classes; and replacing the phantom packets in the scheduling queues with the additional packets.

12. A method of controlling incoming network traffic to a network device, the method comprising:

receiving a first network packet at a first time;

identifying a first network traffic class associated with the first network packet, wherein the first network traffic class is associated with a minimum guaranteed bandwidth value;

setting an upper bandwidth limit for the first network traffic class at the first time based on the minimum guaranteed bandwidth value and a first portion of an available link-share bandwidth, wherein the first portion of the available link-share bandwidth is based on the minimum guaranteed bandwidth value;

adding the first network packet to a scheduling queue associated with the first network traffic class; and inhibiting the network device from allocating bandwidth in excess of the upper bandwidth limit to the first network traffic class, wherein said inhibiting comprises:

selecting a packet from the scheduling queue in response to a selection of the scheduling queue by a packet scheduler;

determining if the selected packet is a phantom packet;

in response to the determination that the selected packet is a phantom packet, discarding the selected packets; and in response to the determination that the selected packet is not a phantom packet, directing the selected packet towards its destination address.

13. The method of claim 12, wherein the first portion of the available link-share bandwidth is based on a ratio between the minimum guaranteed bandwidth value of the first network traffic class and a sum of the minimum guaranteed bandwidth values for all network traffic classes active at the network device at the first time.

14. The method of claim 12, wherein inhibiting the network device comprises:

determining an available bandwidth for the first network traffic class; and adding at least one phantom packet to the scheduling queue, wherein the at least one phantom packet is equal to the available bandwidth for the first network traffic class.

15. The method of claim 14, determining the available bandwidth comprises:

determining a current bandwidth usage for the first network traffic class; and determining a difference between the upper bandwidth limit and the current bandwidth usage for the first network traffic class.

16. The method of claim 12, wherein adding the first network packet to the scheduling queue comprises:

determining if the scheduling queue includes a phantom packet;

in response to the determination that the scheduling queue includes the phantom packet, replacing the phantom packet in the scheduling queue with the first network packet.

17. The method of claim 12, comprising:

setting a second upper bandwidth limit for the first network traffic class at a second time based on the minimum guaranteed bandwidth value and a first portion of a second available link-share bandwidth at the second time, wherein the first portion of the second available link-share bandwidth is based on a ratio between the minimum guaranteed bandwidth value of the first network traffic class and a sum of the minimum guaranteed bandwidth values for all network traffic classes active at the network device at the second time.

18. The method of claim 17, wherein the first and second available link-share bandwidths at the first and second times are different.

19. The method of claim 17, wherein the sums of the minimum guaranteed bandwidth values for all network traffic classes active at the network device at the first and second times are different.

20. The method of claim 17, wherein the first network traffic class includes a TCP traffic flow.

* * * * *